United States Patent Office

3,340,188
Patented Sept. 5, 1967

3,340,188
DRILLING FLUID
Herbert M. Barrett, Bartlesville, Okla., assignor to Phillips Petroleum Company, a corporation of Delaware
No Drawing. Original application Aug. 23, 1962, Ser. No. 218,858, now Patent No. 3,242,160, dated Mar. 22, 1966. Divided and this application Oct. 23, 1965, Ser. No. 504,177
11 Claims. (Cl. 252—8.5)

This is a division of copending application Ser. No. 218,858, filed Aug. 23, 1962, now Patent No. 3,242,160.

This invention relates to drilling fluids. In one aspect it relates to the preparation and use of drilling fluids containing a novel drilling fluid additive. In another aspect it relates to a novel composition of matter which has particular utility as a drilling fluid additive and to a method for its preparation.

It is well known that in perforating the earthen formations to tap subterranean deposits, such as gas or oil, perforation is accomplished by well drilling tools and a well drilling fluid. The drilling fluid serves to cool and lubricate the drill bit, to carry the cuttings to the surface as the drilling fluid is circulated in and out of the well, to support at least a part of the weight of the drill pipe and drill bit, to provide a hydrostatic pressure head to prevent caving of the walls of the well bore, to deposit on the surface of the well bore a filter cake which acts as a thin, semi-impervious layer to prevent undue passage therethrough of fluids, and to perform other functions as are well known in the drilling art. It is important that the drilling fluid exhibit a relatively low rate of filtration or fluid loss in addition to having desirable rheological properties such as viscosity and gel strength. It is also important that the drilling fluid system should be kept as simple and inexpensive as possible in order to avoid undue expense in drilling the well.

The drilling fluid also has an effect on the friction between the drill pipe and the bore hole and the higher the coefficient of friction between the drill pipe and the formation being drilled, that is, the lower the degree of lubricity of the drilling fluid, the greater the power requirements needed to rotate the drill pipe in the bore hole filled with the drilling fluid. Further in this respect, a drilling fluid having a low degree of lubricity or a high coefficient of friction between the drill pipe and the uncased well bore means that a high degree of drag on the drill pipe results, thereby lessening the useful life of the drill pipe. Therefore, the lubricating properites of the drilling fluid are assuming an increased importance to those skilled in the art, not only with regard to the wearing of the bearings in the drill bit but also with respect to the friction between the drill pipe and the uncased bore hole.

It is therefore an object of this invention to provide a process for reducing the fluid loss, viscosity, and coefficient of friction properties of a drilling fluid. It is also an object of this invention to provide a novel composition of matter which is useful as a drilling fluid additive. Still another object of the invention is a method for controlling the fluid loss properties of a drilling fluid without adversely affecting the rheological properties of the drilling fluid. A further object of the invention is to provide a method for producing a relatively simple and relatively inexpensive drilling mud additive composition. Further objects and advantages of this invention will become apparent to those skilled in the art upon study of the disclosure of the invention including the detailed description of the invention.

Broadly, the invention contemplates a novel composition of matter prepared by sulfonating tall oil pitch, which composition of matter is particularly useful as a drilling mud additive for the purpose of reducing the fluid loss, viscosity and coefficient of friction characteristics of a drilling fluid. In one specific embodiment, the invention contemplates the steps of and the product obtained by sulfonating tall oil pitch with a sulfonating agent, neutralizing the sulfonic acid so produced with a basic radical, such as the ammonium radical or an alkali metal radical, or alkaline earth metal radical, to produce salt of the sulfonated tall oil pitch and then adding the sulfonate so produced to an aqueous base drilling fluid in an amount sufficient to reduce the fluid loss, viscosity and coefficient of friction properties of the drilling fluid. The step of neutralizing the sulfonic acid can be omitted if desired when the composition is to be utilized in an alkaline drilling fluid because the sulfonic acid will be neutralized in the drilling fluid. The sulfonate, however, is a solid which is more convenient to handle than the sulfonic acid which is a soft, amorphous mass.

Tall oil pitch is obtained as the residue in the purification of tall oil and is a mixture of fatty acids, resin acids, sterols and other higher alcohols. Tallene is a tall oil pitch marketed by the West Virginia Pulp and Paper Company.

In preparing the sulfonates of this invention the tall oil pitch is dissolved in a suitable nonsulfonatable diluent such as carbon tetrachloride, chloroform, pentane, n-hexane, octanes, gasoline, kerosene, cyclohexane, diesel fuel and the like. A particularly suitable diluent, in many cases, especially if the sulfonating agent is sulfur trioxide, is liquid sulfur dioxide. The diluent can be added to the tall oil pitch before the sulfonation reaction and further amounts can be added after sulfonation if such is desired. The diluent can be separated from the sulfonation product by distillation, simple heating or extraction with suitable solvents. In many cases the diluent need not be separated from the sulfonation product, especially if the sulfonate is to be used in preparing an oil-containing drilling fluid such as an oil and water emulsion base drilling fluid.

In the practice of this invention, oleum (20 percent fuming sulfuric acid) or anhydrous $SO_3$ are the preferred sulfonating agents although other sulfonating agents such as chlorosulfonic acid can be utilized. The sulfonation reaction can be conducted batchwise by adding the sulfonating agent dropwise to the solution of tall oil pitch in the diluent with agitation; or the sulfonation reaction can be conducted continuously by the simultaneous introduction of sulfonating agent and tall oil pitch in diluent to a suitable mixing device such as that disclosed in copending application Ser. No. 116,583, filed June 12, 1961, now Patent No. 3,188,183, by R. S. Logan. A particularly preferred sulfonating agent is $SO_3$ dissolved in liquid $SO_2$ in which case the tall oil pitch can advantageously be dissolved in liquid $SO_2$.

Sulfonation temperatures are usually controlled within the range of about 32 to about 140° F. although the sulfonation of the tall oil pitch can be accomplished at temperatures in the broad range of about 0 to about 250° F. At temperatures above about 200° F. excessive oxidation with liberation of $SO_2$ often occurs and therefore the higher temperatures are usually avoided. At temperatures below about 32° F. the reaction time can be appreciable and for this reason the lower temperatures are usually avoided. The weight ratio of sulfonation agent to tall oil pitch in terms of $SO_3$ will usually be in the range of about 0.1:1 to 1:1. A particularly preferred ratio is in the range of about 0.25:1 to 0.85:1 because of economy and excellence of product in that range. In batchwise operations normal hexane is a preferred diluent for the tall oil pitch because of its low vapor pressure at the sulfonation conditions.

The reaction mixture, comprising sulfonic acids and diluent, can be neutralized directly by adding thereto a basic radical such as an ammonium radical, an alkali metal radical or an alkaline earth metal radical such as ammonium hydroxide, sodium hydroxide, calcium hydroxide, barium hydroxide, or the corresponding carbonates of the ammonium and metal radicals. Any metal sulfonate of the tall oil pitch can be used as a drilling mud additive; however, the alkali metal and ammonium sulfonates are preferred because of their excellent properties of dispersion in aqueous and oil-containing drilling fluids. Other metals which can be employed in certain situations and for particular purposes include lithium, potassium, magnesium and strontium in the form of the hydroxide, oxide or carbonate.

After the neutralization step the sulfonate can be allowed to settle and then can be separated from the diluent by any conventional method such as decantation, filtration, centrifugation or evaporation. The recovered sulfonate can then be dried and ground to produce the drilling fluid additive of the invention. The sulfonate obtained in the practice of this invention is a brown to black colored, brittle solid, apparently amorphous in nature, which is easily ground to powdered form and is readily dispersible in oil or water.

The drilling fluids of this invention can be prepared by any conventional method. The amount of sulfonate, water, clay and oil or other component employed is dependent upon several variables, such as the nature of the sulfonate itself, density of the drilling fluid desired, the nature of the formation penetrated, and other factors which can be readily determined by those skilled in the art upon being acquainted with this invention. It has long been customary in rotary drilling operations to subject the drilling fluid to simple routine tests from time to time, and these tests are sufficient to indicate the relative amounts of sulfonate, water, clay or oil or other ingredient to be employed. Generally, the amount of sulfonate employed will be that sufficient to form a relatively thin, impervious filter cake on the wall of the well, and in an amount that will impart a sufficiently low viscosity to the drilling fluid in order that it may be pumped readily and circulated and also in an amount that will reduce the coefficient of friction between the metal drill pipe and the earthen well bore to a satisfactory level. In general, the amount of sulfonate added to the drilling fluid will be in the range from about 1 to about 20 pounds per barrel (42 U.S. gallons) of drilling fluid. For oil-in-water emulsion systems the amount of water will usually be in the range from about 99 to 60 percent by weight of the final emulsion and the amount of oil will usually be in the range of about 1 to 40 percent by weight of the final emulsion.

The oil component used in preparing the emulsion drilling fluids of this invention can be any hydrocarbon normally used for this purpose in the art, such as diesel fuel, crude oil, kerosene, gas oil, heavy fuel oil, various petroleum fractions and the like.

Although the drilling fluids of this invention need only contain the water-dispersible and oil-dispersible sulfonated tall oil pitch as the material necessary to obtain desirable rheological properties of the drilling fluid, it is within the scope of this invention to add clays or other finely divided inorganic solids. Other materials can also be included, such as materials commonly used for weighting purposes including finely divided limestone, barite, lead sulfide, oyster shell and the like. For the emulsion systems any suitable conventional emulsifying agent, such as the alkali and alkali earth metal salts of saponifiable oils, including vegetable oils, wood oils, fish oils and the like, can be employed.

The following examples and discussions are illustrative of this invention and specific details for preparing the sulfonates and drilling fluids of this invention are merely illustrative of preferred embodiments thereof and are not to be construed as unduly limiting this invention.

Example I

Tall oil pitch, obtained from Hercules Powder Company, was dissolved in normal hexane in the ratio of 400 parts by weight of tall oil pitch per 1000 parts by weight of normal hexane. Liquid $SO_3$, in the amount of 255 parts by weight, was added with agitation. The maximum temperature was 96° F. A stirred, stainless steel reactor was employed and the reactor was immersed in a water bath to control the temperature. The reaction product was in the form of large, soft lumps. The reaction product was neutralized by adding 170 parts by weight of sodium hydroxide, dissolved in 170 parts by weight of water, and the reaction product was reduced to shot-size lumps. The pH of the neutralized mixture was 9.0. Normal hexane and water were removed by evaporation and the solid sodium sulfonate of the tall oil pitch was ground to a powder.

Fluid loss tests were conducted on a drilling fluid made up of Baroco (a commercially available drilling clay) according to "Recommended Practice on Standard Field Procedures for Testing Drilling Fluids," API, Code No. 29. Sulfonated tall oil pitch (STOP) was added to the base mud in an amount equivalent to 6 pounds of STOP per barrel of mud. The results of the tests are shown in Table I.

TABLE I.—WATER LOSS PROPERTIES 30 MIN.

|  | Ml. | 5% Diesel Oil Added, ml. |
|---|---|---|
| Base Mud [1] | 26.5 | 21.0 |
| Base Mud+6 lb./bbl. STOP | 17.5 | 11.2 |

[1] 2 lb./bbl. of Baroco+¼ lb./bbl. Sodium Carboxymethyl Cellulose.

The above results show the beneficial effects of the STOP in aqueous, and also in oil-in-water emulsion, drilling fluids.

The beneficial effects of the STOP on the inhibition of bentonite swelling in drilling fluids were determined according to the procedure described in "The Measurement of Plastic Flow Properties of Drilling Mud," by Chisholm and Kohen in the Petroleum Engineer, April 1954, beginning at p. 425. The results are shown in Table II.

TABLE II.—INHIBITION OF BENTONITE SWELLING

|  | Bentonite lbs./bbl. added to Base Mud | | |
|---|---|---|---|
|  | 0 | 20 | 30 |
|  | Plastic Viscosity/Yield Point | | |
| Base Mud [2] | 2/0 | 13/9 | 41/68 |
| Base Mud+6 lb./bbl. STOP | 2/0 | 9/5 | 19/17 |

[2] 2 wt. percent bentonite in distilled water+1 lb./bbl. quebracho+¼ lb./bbl. NaOH.

The results show that the STOP inhibits the swelling of bentonite.

Example II

Water-base alkaline drilling fluids containing 12.5 weight percent McCracken clay were prepared containing additives as shown in the following Table III. A sample of the drilling mud from a West Texas well was also tested. The lubricity or, conversely, the coefficient of friction of the drilling fluids was determined in a Shell 4-Ball Extreme Pressure Lubricant Tester, made by the Precision Scientific Company, using three glass balls and one steel ball rotating against them. The coefficient of friction measured for each of these drilling fluids according to this technique at various loads is set forth in Table III.

TABLE III.—SHELL FOUR-BALL TESTS USING 3 GLASS BALLS AND 1 STEEL BALL

| | Coefficient of Friction ($\mu$) at Thrust Loading in Kilograms | | | | | |
|---|---|---|---|---|---|---|
| | 6 | 12 | 18 | 24 | 30 | 36 |
| Base Mud (12½% McCracken Clay) | 0.40 | 0.57 | 0.57 | | | |
| Base Mud+10% Diesel Oil | 0.68 | 0.54 | 0.53 | 0.42 | 0.16 | 0.11 |
| 6 Wt. Percent Bentonite Mud | 0.34 | 0.47 | 0.34 | 0.36 | 0.23 | 0.11 |
| Base Mud+4 lb./bbl. STOP | | | 0.001 | 0.037 | 0.082 | 0.11 |
| Base Mud+4 lb./bbl. STOP+5 lb./bbl. CaSO$_4$·2H$_2$O | | | | 0.012 | 0.045 | 0.07 |
| Base Mud+4 lb./bbl. Sulfonated Asphalt | | 0.033 | 0.096 | 0.151 | 0.191 | 0.237 |
| Base Mud+4 lb./bbl. Sulfonated Asphalt+5 lb./bbl. CaSO$_4$·2H$_2$O | 0.013 | 0.015 | 0.150 | 0.185 | 0.200 | 0.185 |
| West Texas Mud [1] | 0.420 | 0.635 | 0.597 | 0.522 | | |
| West Texas Mud+4 lb./bbl. STOP | 0.004 | 0.026 | 0.085 | 0.064 | 0.051 | 0.141 |

[1] Drilling fluid from a drilling well in West Texas.

The excellence of the additive STOP in drilling fluids with respect to the reduction in coefficient of friction of the drilling fluid is demonstrated in the above Table III.

The Shell 4-Ball Tester is essentially a means for rotating one ½-inch ball bearing against three others which are held in rigid position with reference to a sample cup containing the lubricant (as well as the three ball bearings). There is a lever and thrust bearing arrangement for varying the force with which the three balls are pushed up against the rotating ball. Also, there is a torque measuring device attached to the cup assembly. Thee Pyrex glass balls were used below and one steel ball was rotated against them. It was found that this avoided breakage of the glass balls and loads up to 36 kilograms could be applied. This permitted the measurement of a wide range of coefficient of friction, from 0.002 to 1.00 (or more).

Torque is registered on a chart which is wrapped around a drum traveling at one r.p.m. In making a measurement, a base line is drawn with the chart drive operating but with the spindle motor not operating. Then the sample cup is given a thrust load of 6 kilograms and a run of 1 minute is made with the spindle and chart drive both operating. The machine is temporarily shut off and the thrust is raised to 12 kilograms for another 1-minute run. Likewise, runs are made at 18, 24, 30 and 36 kilograms.

The distance (in millimeters) between the base line and the curve (at a given loading) is measured at 5-second intervals and averaged. Then, coefficient of friction=0.3365 U/P where $U$=displacement of pen in millimeters, and
$P$=thrust loading in kilograms.

The above formula presupposes that spring 3 (the most sensitive furnished with the instrument) is used in the torque measuring device.

Advantages of the 4-ball method are small size of sample and speed. About 15 milliliters of sample are required. In addition to 7 minutes' running time, about 25 minutes of cleanup and assembly are required.

Reasonable variations and modifications are possible within the scope of this disclosure without departing from the spirit and scope of the invention.

That which is claimed is:

1. A drilling fluid comprising a fluid medium having a continuous aqueous phase and an additive selected from the group consisting of an alkali metal sulfonate of tall oil pitch, an alkaline earth metal sulfonate of tall oil pitch, and the ammonium sulfonate of tall oil pitch, said additive being present in an amount sufficient to reduce the filtration rate and the coefficient of friction of said drilling fluid.

2. A drilling fluid according to claim 1 wherein said additive is present in an amount within the range of about 1 to about 20 pounds per barrel of said drilling fluid.

3. A drilling fluid comprising a fluid medium having a continuous aqueous phase and the sodium sulfonate of tall oil pitch in an amount sufficient to reduce the filtration rate and the coefficient of friction of said drilling fluid.

4. A drilling fluid comprising a fluid medium having a continuous aqueous phase and the calcium sulfonate of tall oil pitch in an amount sufficient to reduce the filtration rate and the coefficient of friction of said drilling fluid.

5. A method of drilling a well with well drilling tools which includes the step of circulating in said well while drilling a drilling fluid having a continuous aqueous phase and containing an additive comprising an alkali metal sulfonate of tall oil pitch in an amount sufficient to reduce the filtration rate and the coefficient of friction of said drilling fluid.

6. A method according to claim 5 wherein said additive is present in an amount within the range of about 1 to about 20 pounds per barrel of said drilling fluid.

7. A method of drilling a well with well drilling tools which includes the step of circulating in said well while drilling a drilling fluid having a continuous aqueous phase and containing an additive comprising an alkaline earth metal sulfonate of tall oil pitch in an amount sufficient to reduce the filtration rate and the coefficient of friction of said drilling fluid.

8. A method according to claim 7 wherein said additive is present in an amount within the range of about 1 to about 20 pounds per barrel of said drilling fluid.

9. A method of drilling a well with well drilling tools which includes the step of circulating in said well while drilling a drilling fluid having a continuous aqueous phase and containing an additive comprising the sodium sulfonate of tall oil pitch in an amount sufficient to reduce the filtration rate and the coefficient of friction of said drilling fluid.

10. A method of drilling a well with well drilling tools which includes the step of circulating in said well while drilling a drilling fluid having a continuous aqueous phase and containing an additive comprising the ammonium sulfonate of tall oil pitch in an amount sufficient to reduce the filtration rate and the coefficient of friction of said drilling fluid.

11. A method of drilling a well with well drilling tools which includes the step of circulating in said well while drilling a drilling fluid having a continuous aqueous phase and containing an additive comprising the calcium sulfonate of tall oil pitch in an amount sufficient to reduce the filtration rate and the coefficient of friction of said drilling fluid.

(References on following page)

References Cited

UNITED STATES PATENTS

| | | | |
|---|---|---|---|
| 1,980,414 | 11/1934 | Lindner | 260—98 |
| 2,278,170 | 3/1943 | De Groote et al. | 260—98 |
| 2,555,794 | 6/1951 | Henkes | 252—8.5 |
| 2,696,468 | 12/1954 | Fischer | 252—8.5 |
| 2,828,194 | 3/1958 | Hopkins et al. | 252—151 |
| 2,844,624 | 7/1958 | Bloch | 252—353 |
| 2,857,331 | 10/1958 | Hollingsworth et al. | 260—97.5 |
| 3,047,493 | 7/1962 | Rosenberg | 252—8.5 |
| 3,242,160 | 3/1966 | Barrett | 260—97.5 |

FOREIGN PATENTS 1,037,388  8/1958  Germany.

LEON D. ROSDOL, *Primary Examiner.*

H. B. GUYNN, *Assistant Examiner.*